(12) United States Patent
S et al.

(10) Patent No.: US 12,086,581 B2
(45) Date of Patent: Sep. 10, 2024

(54) INCREASED RESOURCE USAGE EFFICIENCY IN PROVIDING UPDATES TO DISTRIBUTED COMPUTING DEVICES

(71) Applicant: Dell Products L.P., Round Rock, TX (US)

(72) Inventors: Vivek S, Bangalore (IN); Amit Singh, Karnataka (IN); Rishi Kumar, Bihar (IN); Sasikumar Subramani, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 239 days.

(21) Appl. No.: 17/566,322

(22) Filed: Dec. 30, 2021

(65) Prior Publication Data

US 2023/0214203 A1 Jul. 6, 2023

(51) Int. Cl.
*G06F 9/44* (2018.01)
*G06F 8/65* (2018.01)
*G06Q 10/087* (2023.01)

(52) U.S. Cl.
CPC ............ *G06F 8/65* (2013.01); *G06Q 10/087* (2013.01)

(58) Field of Classification Search
CPC ... G06F 16/23; G06F 8/65; G06F 8/61; G06F 8/71
USPC .................................................. 717/168–178
See application file for complete search history.

(56) References Cited

U.S. PATENT DOCUMENTS

| 2013/0138783 A1* | 5/2013 | Mallur | G06F 8/65 709/221 |
| 2016/0014039 A1* | 1/2016 | Reddy | H04L 41/5096 709/224 |
| 2018/0321934 A1* | 11/2018 | Chaganti | G06F 8/61 |

* cited by examiner

*Primary Examiner* — Chuck O Kendall
(74) *Attorney, Agent, or Firm* — Amin, Turocy & Watson, LLP

(57) ABSTRACT

Servers at a data center having similar hardware configurations are grouped together; a leader server is determined from members of the group. A remote network management console discovers the leader without necessarily discovering each particular server and provides a firmware update to only the leader via a communication network over which the systems management console/application and the group of servers can communicate. The leader receives the firmware update and distributes the update to the other group members. In a cluster environment where servers of a group are substantially identical to one another, a leader of the cluster may use a discovery protocol to determine a catalog of current firmware versions of cluster members and their respective peripherals. Based on the catalog, the systems management console/application determines a custom firmware update that will normalize each member of the cluster to one another and forwards the custom update to the cluster leader.

20 Claims, 12 Drawing Sheets

```
┌─────────────────────────────────────────────────────┐
│  TRANSMITTING OF UPDATE INFORMATION COMPRISES       │
│  TRANSMITTING THE UPDATE INFORMATION TO THE LEADER  │
│  COMPUTER COMPONENT AS A SINGLE INVENTORY UPDATE    │
│  GENERATED BY A SYSTEMS MANAGEMENT CONSOLE, AND     │
│  WHEREIN, AS PART OF THE TRANSMITTING OF THE UPDATE │
│  INFORMATION, THE SYSTEMS MANAGEMENT CONSOLE DOES NOT│
│  TRANSMIT THE UPDATE INFORMATION TO ANY OF THE AT LEAST│
│  ONE OF THE COMPUTER COMPONENTS THAT HAVE THE SIMILAR│
│  PARAMETER INFORMATION AS THE LEADER COMPUTER       │
│  COMPONENT                                          │
└─────────────────────────────────────────────────────┘
                                                  805
                          │
                          ▼
┌─────────────────────────────────────────────────────┐
│  DETERMINING OF A LEADER COMPUTER COMPONENT COMPRISES│
│  DETERMINING THE LEADER COMPUTER COMPONENT BASED ON THE│
│  LEADER COMPUTER COMPONENT BEING A CLOSEST COMPONENT│
│  TO A TOP OF RACK NETWORK SWITCH, BASED ON THE LEADER│
│  COMPUTER COMPONENT BEING A LOWEST RESOURCE LOADING │
│  COMPUTER COMPONENT, AMONG THE AT LEAST ONE OF THE  │
│  COMPUTER COMPONENTS THAT HAVE THE SIMILAR PARAMETER│
│  INFORMATION, WITH A LOWEST RESOURCE LOADING, OR    │
│  RANDOMLY.                                          │
└─────────────────────────────────────────────────────┘
                                                  810
                          │
                          ▼
┌─────────────────────────────────────────────────────┐
│  PARAMETERS CORRESPONDING TO THE SIMILAR            │
│  PARAMETER INFORMATION OF THE AT LEAST ONE OF THE   │
│  COMPUTER COMPONENTS COMPRISE: A CHIPSET SPECIFICATION│
│  PARAMETER OR A HARDWARE INVENTORY PARAMETER.       │
└─────────────────────────────────────────────────────┘
                                                  815

RECEIVING, BY A LEADER COMPUTER COMPONENT COMPRISING A PROCESSOR AND THAT IS PART OF A GROUP OF COMPUTER COMPONENTS OF A COMPUTER NETWORK SYSTEM IN A CENTRAL NETWORK LOCATION, AN INVENTORY UPDATE VIA A TRANSMISSION FROM A SYSTEM MANAGEMENT CONSOLE THAT IS REMOTE FROM THE CENTRAL NETWORK LOCATION, WHEREIN THE GROUP OF COMPUTER COMPONENTS HAVE BEEN DETERMINED TO HAVE SIMILAR PARAMETER INFORMATION ACCORDING TO A SIMILARITY CRITERION; AND FORWARDING, BY THE LEADER COMPUTER COMPONENT THE INVENTORY UPDATE TO OTHER ONES OF THE GROUP OF COMPUTER COMPONENTS THAT HAVE THE SIMILAR PARAMETER INFORMATION,

1005

WHEREIN THE INVENTORY UPDATE THAT IS RECEIVED FROM THE SYSTEM MANAGEMENT CONSOLE IS THE ONLY INVENTORY UPDATE THAT IS RECEIVED FROM THE SYSTEM MANAGEMENT CONSOLE FOR THE GROUP OF COMPONENTS THAT HAVE THE SIMILAR PARAMETER INFORMATION.

INCREASED RESOURCE USAGE EFFICIENCY IN PROVIDING UPDATES TO DISTRIBUTED COMPUTING DEVICES

BACKGROUND

Data centers may comprise multiple servers from different vendors that may each have different characteristics from one server to another. Network discovery of each server node of a vendor (i.e., manufacturing company) is required to maintain the servers up to date. An existing process to maintain servers up-to-date typically includes: A systems management console that will be used to perform firmware updates obtains device Internet protocol ("IP") addresses of servers to be updated; the systems management console obtains a list of active responding devices' IP addresses; the systems management console initiates a communication session/thread to each server of which it obtained an IP address to obtain the current inventory (i.e., current firmware load version) for every node/server; for every device node, compare the current inventory with a firmware version as provided from a given server's manufacturer; and push updated firmware from the systems management console as a separate update file or load to each of the multiple servers/nodes that are deemed to need an update. There is no predefined set of servers grouped together to receive a given update. Even in a cluster (identical server) environment updated firmware inventory is transmitted to each node from the systems management console. Thus, time is expended to discover the presence of, and the firmware versions of, each target server/node in the subnet at the data center. Network bandwidth between a systems management console and each target server/node is consumed to provide a firmware update to each server/node. In addition, frequent, periodic polling by a systems management console of target servers/nodes at the data center to obtain reports of current firmware updates consumes network bandwidth and time of use by the systems management console application. In a cluster environment, inside a single cluster, drifts in firmware versions may occur resulting in different firmware from server to server even when each server is substantially identical from a hardware perspective, and the systems management console application periodically collects current firmware inventory from each server, thus consuming network bandwidth and systems management console usage time to obtain the firmware inventory of each server of a cluster separately.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method comprises receiving, by a system comprising a processor, respective parameter information of computer components. The processor may be part of a computer system of an enterprise's information technology system 'cloud' ("IT cloud") that is running a systems management application or a systems management console application. A systems management console application may provide a user interface for a user, authorized to log in to and to make changes within the IT cloud, to review firmware loads of the computer components, such as a plurality of various servers, that provide services to client computing devices of the enterprise, or to customers/potential customer of the enterprise. The processor, or application running thereon, may determine a leader computer component from the computer components as corresponding to at least one of the computer components as having matching, or similar, parameter information as the leader computer component according to a similarity criterion. A similarity criteria may include characteristic, or parameter, information for parameters such as manufacturer, manufacturer model number, manufacturer model name, manufacture date, attached one or more hardware peripherals (including manufacturer or name or model number of date of the one or more hardware peripheral). Accordingly, the leader computer component is a computer component of a group of other computer components that all share similar, or identical, characteristic, or parameter, information. The processor, or application running on the computer system of the enterprise's information technology system transmits update information representative of an inventory update to the leader computer component of the computer components of the group for distribution by the leader computer component to the at least one of the computer components that have the similar parameter information as the leader computer component. The inventory update typically comprises a firmware update, but could comprise a software update instead of, or in addition to, a firmware update.

In an example embodiment, at least one of the computer components are servers, wherein the leader computer component is a server of the servers, and wherein the inventory update comprises revisions for firmware of each of the at least one of the computer components that have the similar parameter information as the leader computer component. It will be appreciated that typically all of the computer components are servers, but it is possible that firmware updates could be directed to computer components that are not servers, such as switches, routers, storage drives, or software modules.

In an example embodiment, the computer components are coupled to a top of rack network switch.

In an example embodiment, the transmitting of the update information comprises transmitting the update information to the leader computer component as a single inventory update generated by a systems management console, or by an application that provides it. In an example embodiment, as part of the transmitting of the update information the systems management console does not transmit the update information to any of the at least one of the computer components that have the similar parameter information as the leader computer component.

In an example embodiment, the leader computer component is determined based on the leader computer component being a closest component to a top of rack network switch. In an example embodiment, the leader computer component is determined based on the leader computer component being a lowest resource loading computer component, among the at least one of the computer components that have the similar parameter information, with a lowest resource loading. In an example embodiment, the leader computer component is determined randomly. In an example embodiment, the leader computer component is determined manually by a user using a systems management console user interface.

In an example embodiment, parameters corresponding to the similar parameter information of the at least one of the computer components comprise: a chipset specification parameter or a hardware inventory parameter. A chipset specification parameter may comprise a processor model number of a processor corresponding to, or that is supported by, one or more other chips on a mainboard or mother board of a server. A hardware inventory parameter may include a particular hardware peripheral that is attached to, coupled with, or that is part of, a server.

In an example embodiment, Link Layer Discovery Protocol ("LLDP") is used for computer components (e.g., servers) at the data center to broadcast information, including current firmware versions, and communicate with other computer components/servers. For example, using LLDP, or other similar discovery protocol, a leader computer component/server may obtain IP addresses of other computer components/servers in a group as well as current firmware versions of the servers. In an example embodiment, the leader computer component/server of a cluster may use LLDP, or other similar discovery protocol, to obtain versions of firmware currently loaded on other servers of the cluster, as well as hardware of peripherals that compose the servers. The leader of the cluster may then generate a catalogue of the firmware versions of the other components of the cluster and forward the catalogue to a systems management console, or application that provides, same, for use by the systems management console, or application that provides same, in creating and generating a custom firmware package, load, or file, for forwarding to the leader server of the cluster for further distribution thereby to the other servers of the cluster such that each server of the cluster have the same firmware versions.

A system comprises a leader computer component of a group of computer components of a computer network system in a central network location, wherein the computer components are determined to be members of the group because they have similar parameter information according to a defined similarity criterion, the leader computer component comprises a processor to facilitate execution of operations that comprise: receiving update data representative of an inventory update via a transmission initiated from a system management console at a remote network location that is remote from the central network location, and forwarding the update data to other ones, other than the leader computer component, of the computer components that have the similar parameter information. The receiving of the inventory update may comprise receiving an only inventory update from the system management console for the computer components that have the similar parameter information. In other words, the leader receives only one update package, file, or firmware (or software) load but distributes copies of the one update package to each of the members of the group of computer components.

In an example embodiment t, the computer components of the computer network system are coupled to a top of rack switch, wherein the top of rack switch is configured to collect the parameter information of each of the computer components coupled thereto according to a discovery protocol that directs and manages collection and organizing information about managed devices on Internet protocol networks. An example discovery protocol that may be used is a Link Layer Discovery Protocol.

In an example embodiment, the system management console, or an application that provides it, is configured to collect the parameter information of each of the computer components coupled to a top of rack switch according to a protocol that directs and manages collection and organizing information about managed devices on Internet protocol networks for purposes of determining the leader computer component of the computer components before the inventory update is transmitted to the leader node. In an example embodiment the system management console, or application running it, discovers the leader node to transmit the inventory update to according to the protocol that directs and manages collection and organizing information about managed devices on Internet protocol networks without discovering the other of the computer components for purposes of transmitting the inventory update.

In an example embodiment, the protocol that directs and manages collection and organizing information about managed devices on Internet protocol networks is simple network management protocol. In an example embodiment the simple network management protocol is a link layer discovery protocol.

In an example embodiment, the central network location is a data center. In an example embodiment the system management console is a user interface configured to access the central network location via an internetworking protocol.

In an example embodiment, the processor of the leader node is further configured to: collect parameter information of each of the computer components according to a that directs and manages collection and organizing information about managed devices on Internet protocol networks, determine a catalogue of firmware versions of each, or associated with each (i.e., firmware of hardware devices/peripherals that may be part of a given server) of the respective computer components of the computer components, determine a preferred firmware version, or preferred firmware versions when the inventory update includes firmware updates for more than one type of hardware device, based on the catalogue of firmware versions, and transmit, according to the protocol for collecting and organizing information about managed devices on Internet protocol networks, preferred firmware, corresponding to the preferred firmware version, or versions, to the other of the computer components that are not running according to, or being operated by, the preferred firmware version, or versions.

Another example method comprises receiving, by a leader computer component comprising a processor and that is part of a group of computer components of a computer network system in a central network location, an inventory update via a transmission from a system management console that is remote from the central network location, wherein the group of computer components have been determined to have similar parameter information according to a similarity criterion; and forwarding, by the leader computer component the inventory update to other ones of the group of computer components that have the similar parameter information. In an example embodiment, the inventory update, which may be a computer file or other form of computer of code, information, or data, that is received from the system management console is the only inventory update that is received from the system management console for the group of components that have the similar parameter information.

In an example embodiment, the group of computer components of the computer network system are coupled to a top of rack switch. In an example embodiment, the top of rack switch is configured to collect the similar parameter information of the group of computer components coupled thereto according to a discovery protocol that directs and manages collection and organizing information about managed devices on Internet protocol networks.

In an example embodiment, the leader computer component is determined using a protocol that directs and manages collection and organizing information about managed devices on Internet protocol networks, wherein the determining of the leader computer component occurred before the receiving of the inventory update by the leader computer component, and wherein the system management console discovered the leader computer component according to the protocol that directs and manages collection and organizing information about managed devices on Internet protocol networks without discovering other ones of the group of computer components that will receive the inventory update in addition to the leader computer component.

In an example embodiment, the leader computer component is determined using a protocol that directs and manages collection and organizing information about managed devices on Internet protocol networks, wherein the determining of the leader computer component occurred before the receiving of the inventory update by the leader computer component, and wherein the group of computer components of the computer network system determined the leader computer component using information collected or generated according to the protocol that directs and manages collection and organizing information about managed devices on Internet protocol.

In an example embodiment, the leader computer component; collects parameter information of each of the group of computer components according to a protocol that directs and manages collection and organizing information about managed devices on Internet protocol networks; determines a catalogue of firmware versions of each of the group of computer components; determines a preferred firmware version, or version, based on the catalogue of firmware versions; and transmits preferred firmware data, or one or more updates, corresponding to the preferred firmware version, to any of the other ones of the group of computer components that are not executing firmware according to the preferred firmware version, or versions.

In an example embodiment, in response to determining that the leader computer component is not currently executing firmware according to the preferred firmware, forwarding, by the leader computer component, an instruction from the leader computer component to one of the group computer components executing firmware according to the preferred firmware version to forward the firmware therefrom to the leader computer component.

In an example embodiment, the protocol that directs and manages collection and organizing information about managed devices on Internet protocol networks is a link layer discovery protocol.

In an example embodiment the group of computer components is a group of computer servers in a data center rack, and wherein the inventory update is a preferred version of server firmware to be used by members of the group of computer servers.

BRIEF DESCRIPTION OF THE DRAWINGS

FIG. 8 illustrates a flow diagram of embodiments of a method for delivering an update to each of a group of similar computer components, such as servers, via a leader computer component, or leader server, of the group.

FIG. 10 illustrates a flow diagram of a method performed by a leader server in updating multiple servers having similar characteristics as the leader server.

DETAILED DESCRIPTION OF THE DRAWINGS

Figure 1:
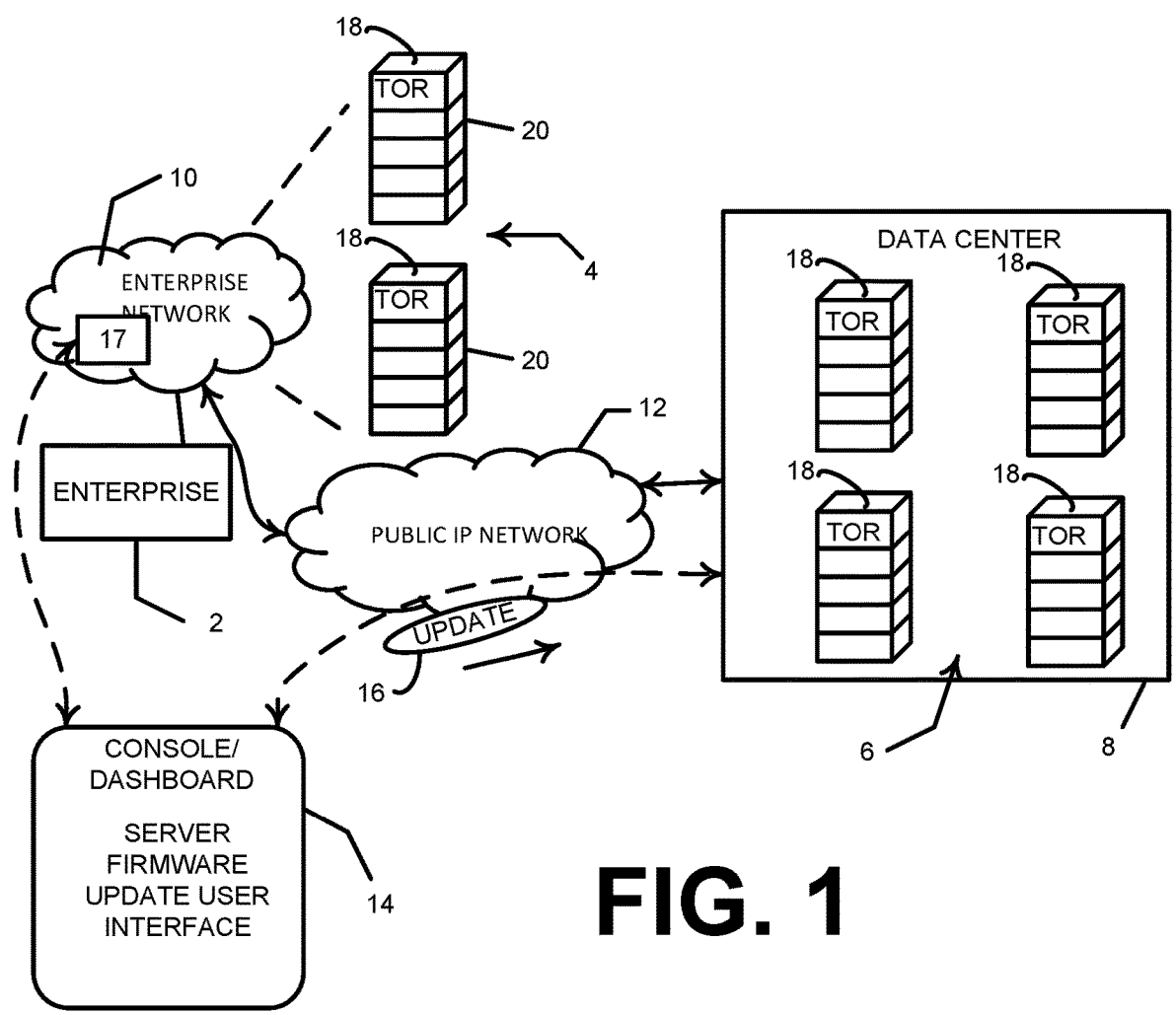
FIG. 1 illustrates a network diagram of a system of enterprise servers located remotely (logically or geographically) from an enterprise's information technology cloud.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

One or more embodiments of the present application minimize firmware or software package updates transmitted to servers remote from a central location from which one or more update packages are distributed.

Turning now to the figures, FIG. 1 illustrates a diagram showing a system of enterprise servers located remotely (logically or geographically) from an enterprise's information technology cloud. Enterprise 2 may be a university, an individual, a business entity, or other organization that operates, owns, or maintains one or more servers. The servers may be a plurality of local servers 4 that may be located geographically where the individual or organization operates or conducts business. The servers may be a plurality of remote servers 6 located remotely from where the individual or organization operates. For example, remote server 6 may be located at a data center 8 that is physically located at a remote location from enterprise 2. As shown in the figure, remote servers 6 at data center 8 are coupled with, or communicate with, enterprise communication network/cloud 10 via a larger/wider area communication network 12, such as the Internet. Enterprise 2, or a user authorized thereby to perform maintenance and updates of local servers 4 or remote servers 6, may use a systems management console/dashboard user interface 14 to cause a software or a firmware update 16 to be transmitted to remote servers 6 at data center 8. It will be appreciated that although the figure only shows update 16 being directed toward remote servers 6 at data center 8, update 16 may also be directed to local server 4. The dashboard of systems management console 14 may be a user interface software application running on a browser being used by user who has logged in to a systems management application 17 that may be part of the information technology cloud 10 of enterprise 2. The systems management application 17, or the systems management console application, (the terms/phrases 'systems management application' and 'systems management console application' may be used interchangeably herein unless noted otherwise) may configure a processor of a computer device that is connected to, coupled with, or otherwise part of, information technology cloud 10 to perform one or more tasks, such as retrieving information or data corresponding to local servers 4 or remote servers 6. Such server information that corresponds to servers 4 or 6 that systems management application 17 or systems management console application 14 may retrieve may include each of the servers': manufacturer name; manufacture date; serial number of a component thereof; such as a serial number of a circuit board with a given installed chipset type, model, or serial number; peripherals or hardware devices that may be coupled with, or part of, the given server; and other characteristics that may be facilitated by a particular firmware or software loaded into a memory, such as an erasable programmable read only memory, a magnetic storage component, such as a tape drive, a hard drive, a disc drive, a solid state drive, an optical drive, and the like. Software or firmware loaded, or installed, to a memory of a given server, or software or firmware to be installed or loaded to a memory of a given server, may be referred to as a software or firmware 'load' or software or firmware 'module.'

Systems management application 17 may evaluate information retrieved from local servers 4 and remote servers 8 and group the servers such that one or more servers having similar characteristics are designated as being part of a particular group. After designating each of a plurality of servers as being members of a particular group, an update for each of the servers may be transmitted to one of a given particular group of servers that may be designated as a leader server, or as a leader node. The leader node, or leader server, may, after receiving an update, distribute the update to one or more of the other servers, or other computer components, that are members of a given particular group. This provides an advantage that only one instance, or transmission, of update 16, as shown in FIG. 1, may be transmitted to a leader server of servers 6 at data center 8 over communication network 12. The leader server may then distribute a copy of update 16 to each of the other remote servers 6 that may be members of the same group as the leader server. Thus, a separate copy of update 16 is not transmitted from systems management application 17 to each of a plurality of remote servers 6 that make up a given group (i.e., the servers of the group share one or more characteristics such as manufacturer and model number); instead only one copy of update 16 is transmitted via communication network 12 thus minimizing resources of network 12 used (i.e., time and bandwidth usage may be minimized).

To determine how to group servers, or nodes, systems management application 17, or systems management console 14, may use prestored information, such as manufacturer or model number, of local servers 4 or remote servers 6. Or, after a leader server/node has been determined, a discovery process may be performed by a leader server/node to determine inventory of each of a plurality of servers that the leader can communicate with. For example, Link Layer Discovery Protocol ("LLDP") may be used initially to obtain characteristic information corresponding to each of a plurality of servers, such as the manufacturer and model number of each of the servers. Software or firmware versions (including revision numbers or firmware from different suppliers for similar servers or hardware that composes the servers) may also be discovered by LLDP. It will be appreciated that other discovery protocols may be used instead of LLDP depending on manufacturer of components the information of which is being discovered. Other examples of discovery protocols that may be used include, but are not limited to: Cisco Discovery Protocol, Foundry Discovery Protocol, Nortel Discovery Protocol and Link Layer Topology Discovery, and protocols similar to protocols defined by, contemplated by, or that may be defined in the future by, IEEE Station and Media Access Control Connectivity Discovery specification, currently specified by IEEE 8021AB and supported by IEEE 802.3 section 6 clause 79.

A leader server/node may be determined in a number of ways, including which server is in a rack space in a data center that is closest to a 'top-of-the-rack' switch ("TOR"). Information as to which slot in a rack a particular server occupies may be already stored at, or accessible by, systems management application 17, or may be discovered according to a discovery process initiated by system management application 17 or system management console 14. Being deemed 'closest' to a TOR may be based on being in a rack space physically closest to a TOR switch, may be based on a wiring configuration within a given rack, or series of racks, that contain(s) a plurality of servers. As shown in FIG. 1, each rack of local servers 4 and remote servers 6 includes a TOR switch 18 in the top rack space of corresponding rack 20. The topmost server in the topmost rack space immediately below a TOR switch in a given rack of servers 20 may be designated as a leader server for other servers occupying other rack spaces in the given rack of discrete servers 20.

In another embodiment, a leader server/node may be designated as a leader based on age. In another embodiment, a leader server/node may be designated as a leader dynamically based on current resource loading (i.e., when a leader is being determined a server of a given rack 20 may be designated as a leader if it is currently serving the least number of clients or providing the least amount to computing or data resources to one or more clients).

In an embodiment, a leader server may be determined automatically among servers according to a predetermined method. For example, discrete servers in a rack may report their current resource loading to each other via LLDP and each of the plurality of servers in the given rack may acknowledge the server from among them having the lowest resource loading as the leader server/node. In an embodiment, systems management application 17 or systems management console 14 may determine a leader server/node based on predetermined information of servers' locations within their respective racks or based on current resource loading.

Figure 2:
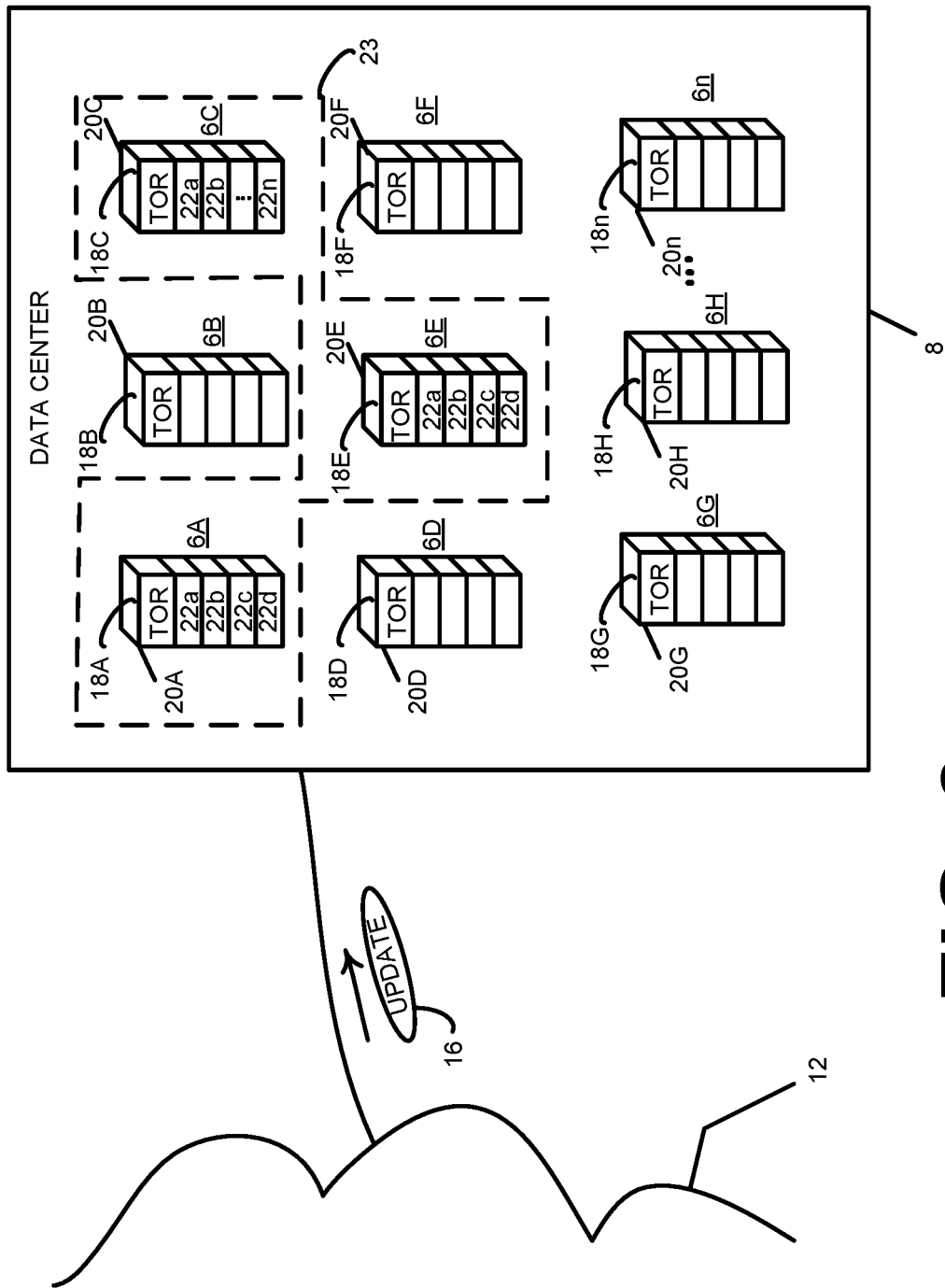
FIG. 2 illustrates multiple servers at a data center coupled to a communication network.

Turning now to FIG. 2, remote servers 6 are shown labeled as remote severs 6A-6n comprising corresponding server racks 20A-2n. Each server rack 20 includes a TOR switch and discrete servers a-n (in the figure the letter 'n' is meant to imply an undefined number; it is no meant imply that a given rack 20 may only include fourteen discrete servers). In the figure, remote servers 6A, 6C, and 6E are shown as grouped together as group 23 by the broken line that surrounds them. Although each server rack 20A, 20C, and 20E includes a TOR switch, in an embodiment one of discrete servers 22a-22n of all of the server racks may be designated as a leader server. In an embodiment, each rack 20A, 20C, and 20E may include its own leader server 22. For example, discrete server 22a may be designated as the leader server for the discrete servers composing rack 20A because it is the discrete server occupying the rack space immediately below the TOR switch 18A. In similar fashion, discrete server 22a of rack 20C may be designated as the leader server of remote server 6C and discrete server 22a of rack 20E may be designated as the leader server of remote server 6E.

In an embodiment, a software or firmware update 16 received from systems management application 17 shown in FIG. 1 may be directed to a leader server in each rack, for example the update 16 would be directed to: discrete server 22a of rack 20A if server 22a was deemed the leader server of one or more of the servers that compose rack 20A; discrete server 22b of rack 20C if server 22b was deemed the leader server of one or more of the servers that compose rack 20C; and discrete server 22n of rack 20E if server 22n was deemed the leader server of one or more of the servers that compose rack 20E. It will be appreciated that not all discrete servers 22a-22n of a given rack 20 will always be grouped together as part of the same grouping, for example not all servers 22a-22n of racks 20A. 20C, and 20E will necessarily be part of group 23 if one of the discrete servers was made by a different manufacturer as the others, if it is a different model number from the others, or if it comprises different hardware peripherals as the others.

Figure 3:
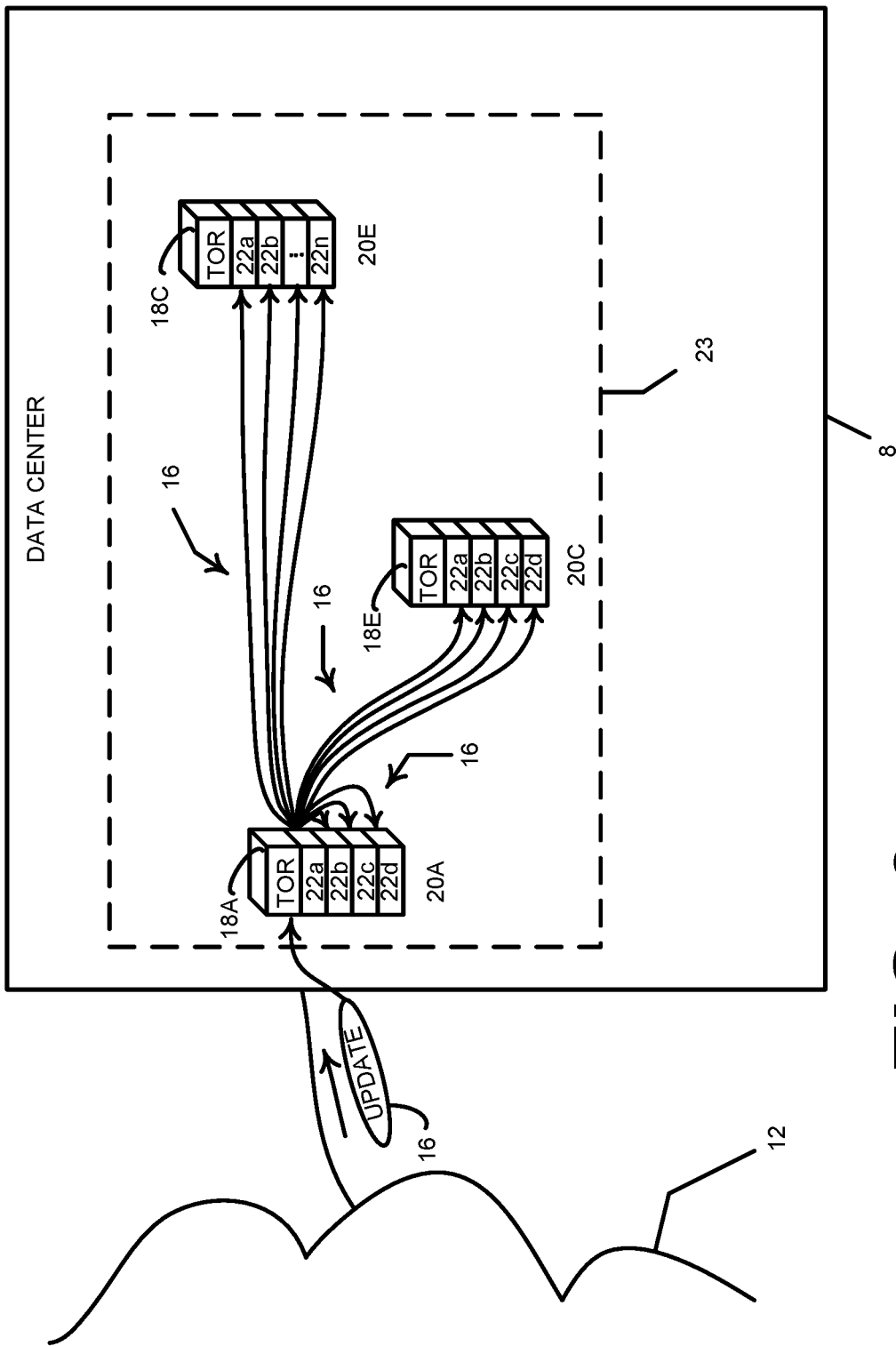
FIG. 3 illustrates servers grouped together based on having similar characteristics and hardware composition each receiving a firmware update package from a leader server that is the only server/node at the data center that received the firmware update package from a communication network.

Turning now to FIG. 3, the figure illustrates discrete server 22a of rack 20A as the leader server of server group 23. For purposes of discussion herein, leader server 22a of rack 20A may be referred to as 22a/20A. Leader server 22a/20A receives update 16 via internet 12 as a single update package, image, file, or other means for transmitting a firmware or software update to remote servers at data center 8. After receiving update 16, leader server 22a/20A distributes update 16 copy as a separate update package/image/file, etc. to each of servers 22b/20A, 22c/20A, 22d/20A, 22a/

20C, 22b/20C, 22c/20C, 22d/20C, 22a/20E. 22b/20E, 22c/20E, and 22d/20E as shown in the figure. Thus, instead of twelve separate update packages/images/files, etc. 16 being transmitted via communication network 12 to each of corresponding servers 22a/20A. 22b/20A. 22c/20A, 22d/20A, 22a/20C. 22b/20C, 22c/20C. 22d/20C, 22a/20E, 22b/20E, 22c/20E, and 22d/20E, a single update package/image/is transmitted via the communication network yet all twelve servers shown in FIG. 3 receive the same updated via leader server 22a/20A.

In addition to eliminating the need to transmit over communication network 12 a separate update package to each discrete server 22, since discovery, via LLDP for example, of servers 22a/20A, 22b/20A, 22c/20A. 22d/20A. 22a/20C. 22b/20C. 22c/20C, 22d/20C. 22a/20E. 22b/20E, 22c/20E, and 22d/20E may be performed by leader server 22a/20A, systems management application 17 or systems management console 14 does not have to perform discovery of each of servers 22a/20A, 22b/20A, 22c/20A. 22d/20A. 22a/20C, 22b/20C, 22c/20C, 22d/20C, 22a/20E, 22b/20E, 22c/20E, and 22d/20E to determine their hardware configuration and current software of firmware status (i.e., version) and whether update 16 is appropriate for the. Such discovery of discrete components of remote servers 6 may take about three seconds per device. For the example shown in FIG. 3 this would take 3 seconds times 12 servers, or 36 seconds; for a larger number of discrete servers 22, for example 300 discrete servers, if discovery of the remote servers by a systems management application 17, or a systems management console 14, at an enterprise would take approximately 3 seconds×300 servers, or 900 seconds, which is fifteen minutes. Thus, not only is bandwidth usage of communication network 12 reduced because only one update package 16 is transmitted to leader server 22a/20A, instead of transmitting a copy of the same update package to each of servers 22a/20A. 22b/20A. 22c/20A. 22d/20A, 22a/20C, 22b/20C, 22c/20C, 22d/20C, 22a/20E, 22b/20E, 22c/20E, and 22d/20E, but discovery time to determine which discrete servers are to get the update package in the first place is significantly reduced.

In an embodiment, a plurality of servers may compose a 'cluster' of servers, a cluster being a group of servers wherein each member server of the cluster comprises essentially exactly the same components (i.e., identical server computer: memory, chipset, storage, peripherals, etc.). Although member servers of a cluster each comprise identical, or almost identical (e.g., different members may have different revisions of motherboard but each has same chipset), their firmware may be of varying revisions. Or, firmware of peripherals that compose the servers of a cluster may vary from server to server. Examples of firmware for peripherals may include firmware for BIOS, access controllers, a backplane, a hard disk drive, a solid-state drive, a storage controller, networking cards, fiber channel cards, and the like. LLDP, or discovery according to another discovery protocol, may be used by a leader server/node of the cluster to determine firmware versions of the servers of the cluster and the peripherals that correspond thereto. In an embodiment, a leader server of a cluster may receive a cluster-specific update from a systems management application or a systems management console application. The cluster-specific update may be transmitted by a systems management console application, or a systems management application, in response to a cluster-update request sent from the leader server of the server cluster. The cluster-update request may be made in accordance with a cluster catalogue derived by the leader server. The cluster catalogue may include firmware versions of each server member of the cluster as well as versions of each member's peripheral hardware firmware. The cluster catalogue may be used to formulate a request for a cluster update that is customized for the particular cluster such that the firmware of each member server and the firmware of the peripherals of each member server is harmonized, normalized, equalized, or otherwise made the same from server to server within a given cluster. In an embodiment, a customized update may differ from an update that is not based on a cluster-specific update request because some cluster firmware, whether for a server chipset, or for peripherals, may already be normalized and up-to-date (e.g., a most recent revision of given firmware) among the member servers of a cluster and thus would not need to be included in the cluster-specific customized update, thus reducing the size of the cluster-specific update relative to the size of an update that may include firmware for chipsets and all peripheral hardware.

Figure 4:
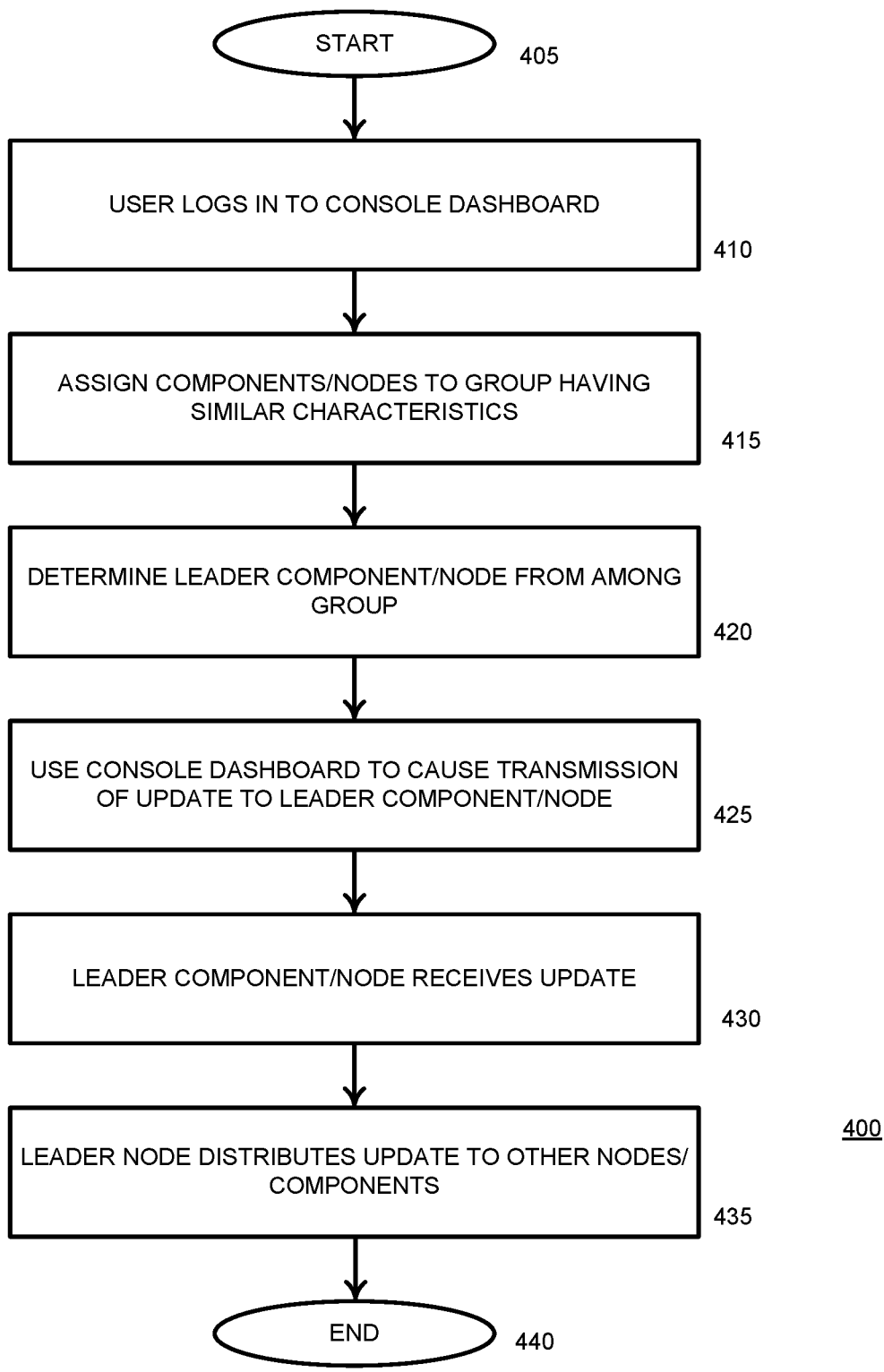
FIG. 4 illustrates a flow diagram of a method for grouping servers according to hardware composition and for updating each server of the group with a leader server of the group.

Turning now to FIG. 4, the figure illustrates a flow diagram of a method 400 for updating multiple servers at a data center with a transmission of a single update package. Method 400 begins at step 405. At step 410, a user logs in to a systems management console user interface, which may be hosted by a systems management console application. At step 415 one or more of the multiple servers may be assigned to a group that comprises servers having similar characteristics such as, for example, the same manufacturer, the same model number, or model numbers, that refer to essentially the same part or assembly, the same or similar chipset, or the same or similar hardware peripherals. During the grouping process a particular model name or model number for example, may be used as a similarity criterion to determine servers to groups together. The grouping together of servers may be performed automatically before the user logs in at step 410 by a systems management application, or the user may use a systems management console to manually, or partially manually, group servers together according to server characteristics/similarity criteria or according other criteria that the user may deem appropriate.

At step 420, a leader server, or leader node, from among the grouped-together servers is determined. A user using a systems management console user interface may assign one of the servers of a group of servers as the leader based on no criteria at all other than the user just selects one from the group. Or, a user may manually, or a systems management application that has access to characteristic information corresponding to each of the servers in the group, may automatically determine a leader based on one or more leader criteria, such as, for example, a server being closest to a TOR switch in a rack of servers, or a given server having a current low resource usage metric value (i.e., the server is not currently using a high percentage of its processor's, or processors', capacity in serving one or more clients).

At step 425, a user using a systems management console dashboard/user interface may select a control item on the user interface (e.g., the user may click an 'Update' button after having selected a group of servers to update). The systems management console, or a systems management application that is providing the user interface/console, transmits an update package to the group leader and the leader server receives the update package at step 430 via wide area network such as the Internet. The leader server distributes locally the update package, typically a firmware update but the update may be a software update, to the other servers in the group. The leader typically updates the received update package to other servers in its group via cabling within the same rack, but it will be appreciated that a group of servers may comprise one or more servers distributed among more than one rack in a data center and that a group leader server may be the leader of one or more servers that are not installed in the same rack in a data center as the leader server. Method 400 ends at step 440.

Figure 5:
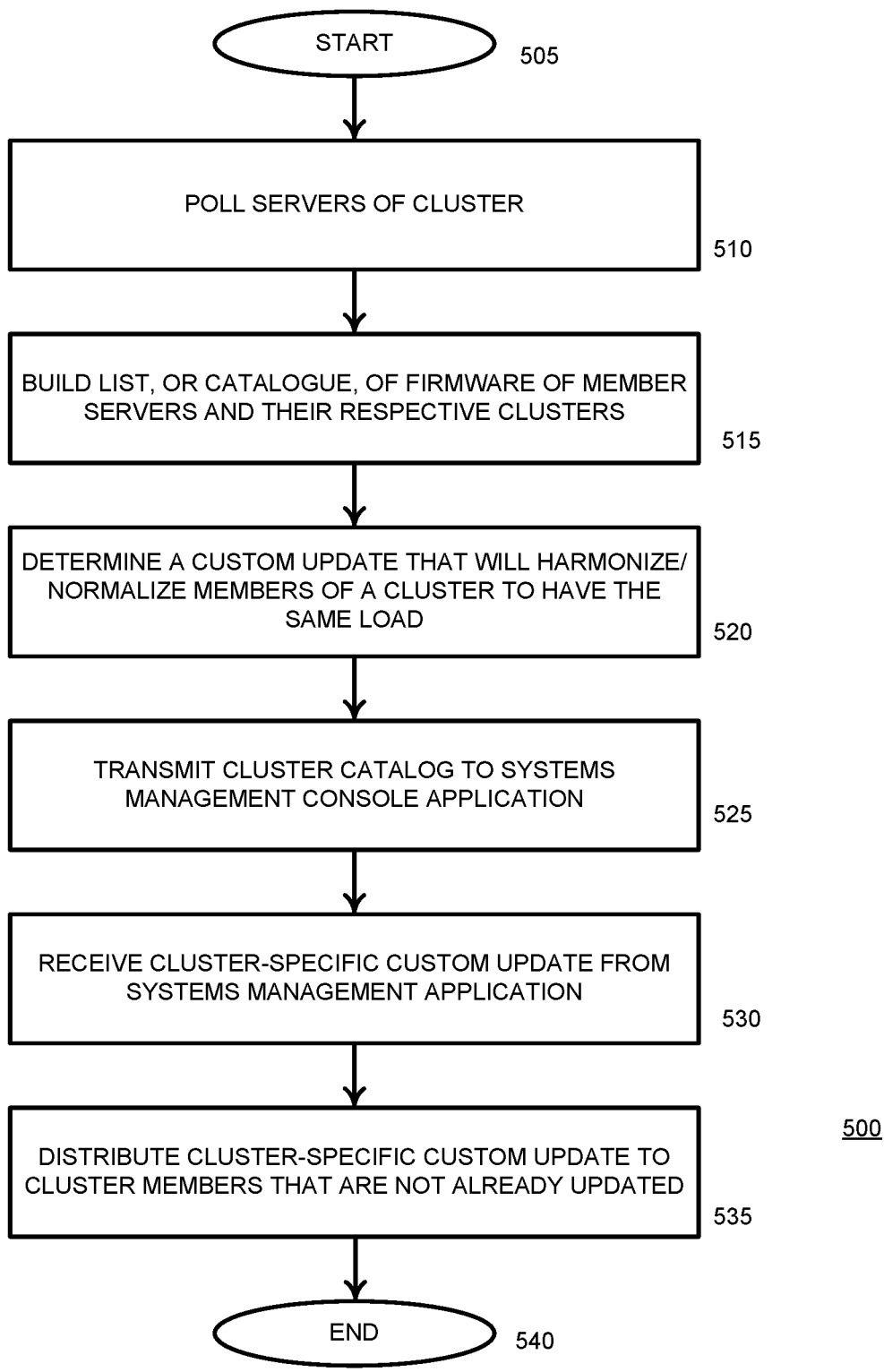
FIG. 5. Illustrates a flow diagram of a method for determining a catalog of firmware of each of a plurality of servers of a cluster, providing a custom firmware update to a leader server of the cluster based on the catalog, and providing from the leader the custom update to other servers of the cluster.

Turning now to FIG. 5, the figure illustrates a flow diagram of a method 500 for providing an update package to a plurality of remote servers that make up a cluster, wherein 'cluster' refers to more than one server that are identical with respect to hardware composition, or very similar to one another with respect to hardware composition such that they are essentially identical. Method 500 starts at step 505. At step 510 a leader server of the cluster of servers polls the other servers in the cluster. The polling of the other servers may comprises sending a discovery request to each of the other servers by the leader server according to a discovery protocol such as, for example, LLDP. The leader server may be determined according to techniques discussed elsewhere herein. In an embodiment, a default designation of a leader server of a cluster is a server that is installed in a rack space closest to a TOR switch of a given server rack.

Each of the servers of the cluster of servers responds to the discovery request with inventory information that provides information of firmware that is stored in a memory of each respective server or that is stored in a peripheral hardware device corresponding to the respective server.

The leader server receives responses from the servers of the cluster that were sent in response to the discovery request that was sent by the leader server. At step 515 the leader server compiles a list, or a catalogue, of currently-installed firmware ('currently' meaning substantially at the time the servers of the cluster sent their responses to the leader server's discovery request). The catalogue may include firmware supplier, firmware version, firmware date, firmware size, firmware optional features, and the like, corresponding to each respective server of the cluster, including the leader server. At step 520 the leader cluster determines, based on the information in the catalog, a custom firmware update that may be needed from a systems management application or a systems management console application to provide to the various servers of the cluster corresponding to the leader server. Such a request for a custom firmware update package may include a request for a most recent version of firmware for the servers' mainboard chip set or may include a request for the most recent firmware version for one or more hardware peripherals that compose the servers of the cluster. Such a custom firmware update package could be distributed to all of the severs of the cluster to 'normalize', harmonize, or otherwise bring the firmware of each of the servers of the cluster to conformity with the firmware of the other servers of the cluster so that each server of the cluster has the same firmware loaded as the other servers of the cluster.

At step 525 the leader server transmits the catalogue over a communication network, such as the Internet, to a systems management application that may be operated or controlled by an enterprise and that may be running on a server that is part of an enterprise's private information technology network, or cloud. It will be appreciated that an enterprises information technology cloud may be implemented by one or more servers and other computer components that may be located remotely from a data center where the cluster of servers is located. In an embodiment, a given enterprise's information technology network cloud may be implemented by servers or other computer components that are installed and maintained at the same data center where the cluster of servers to which the catalogue pertain is installed and maintained.

The systems management application or systems management console application prepares a customized firmware update package (i.e., firmware in digital form that can be transmitted to the leader server of the cluster of servers), transmits the customized update package to the leader server of the cluster of servers to which the catalogue pertain and which catalogue was transmitted at step 525, and the leader server receives the customized update package at step 530. The customized update package typically includes updates that may be used by the servers of the cluster of servers to normalize the servers of the cluster such that the servers of the cluster have the same firmware loaded thereon. It will be appreciated that a customized update package may also include certain firmware that is not needed by the cluster of servers because the member servers of the cluster already have the most recent, or otherwise preferred, version of firmware loaded thereon.

At step 535, the leader server of the cluster of servers distributes the customized update package received at step 530 to one or more of the other servers of the cluster of servers (in some instances some servers of the cluster of servers may not need the customized update package because they already have loaded thereon the preferred one or more firmware loads and thus do not need the customized firmware update package). Method 500 ends at step 545.

Figure 6:
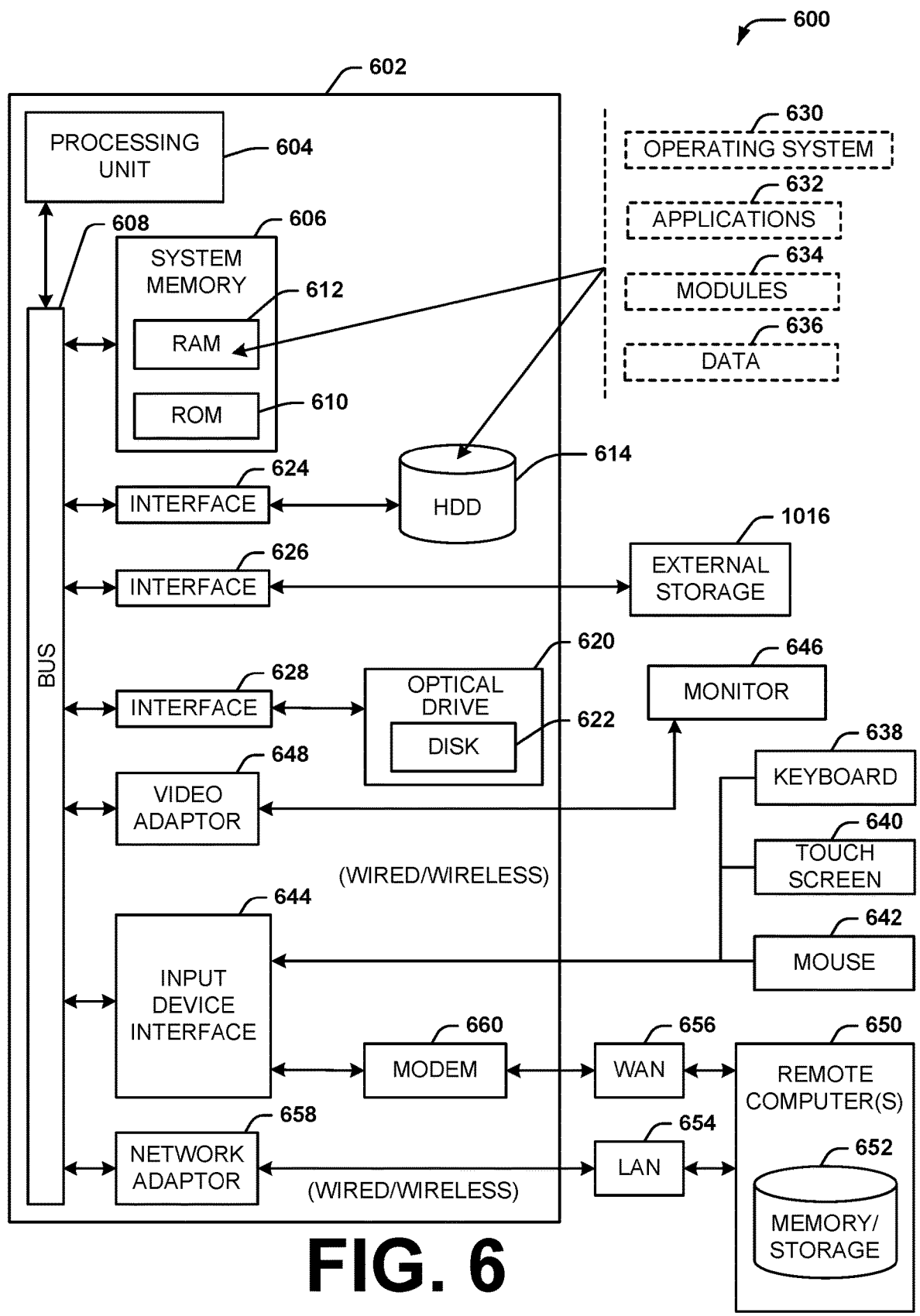
FIG. 6 illustrates a block diagram of an example computer operable to provide any of the various devices described herein.

In order to provide additional context for various embodiments described herein, FIG. 6 and the following discussion are intended to provide a brief, general description of a suitable computing environment 600 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors and may include a cache memory. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

Computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a CD-ROM disc, a DVD, a BD, etc.). While the internal HDD 614 is illustrated as located within the computer 602, the internal HDD 614 can also be configured for external use in a suitable chassis (not shown). Additionally, while not shown in environment 600, a solid state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can comprise a security module, such as a trusted processing module (TPM). For instance with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 7:
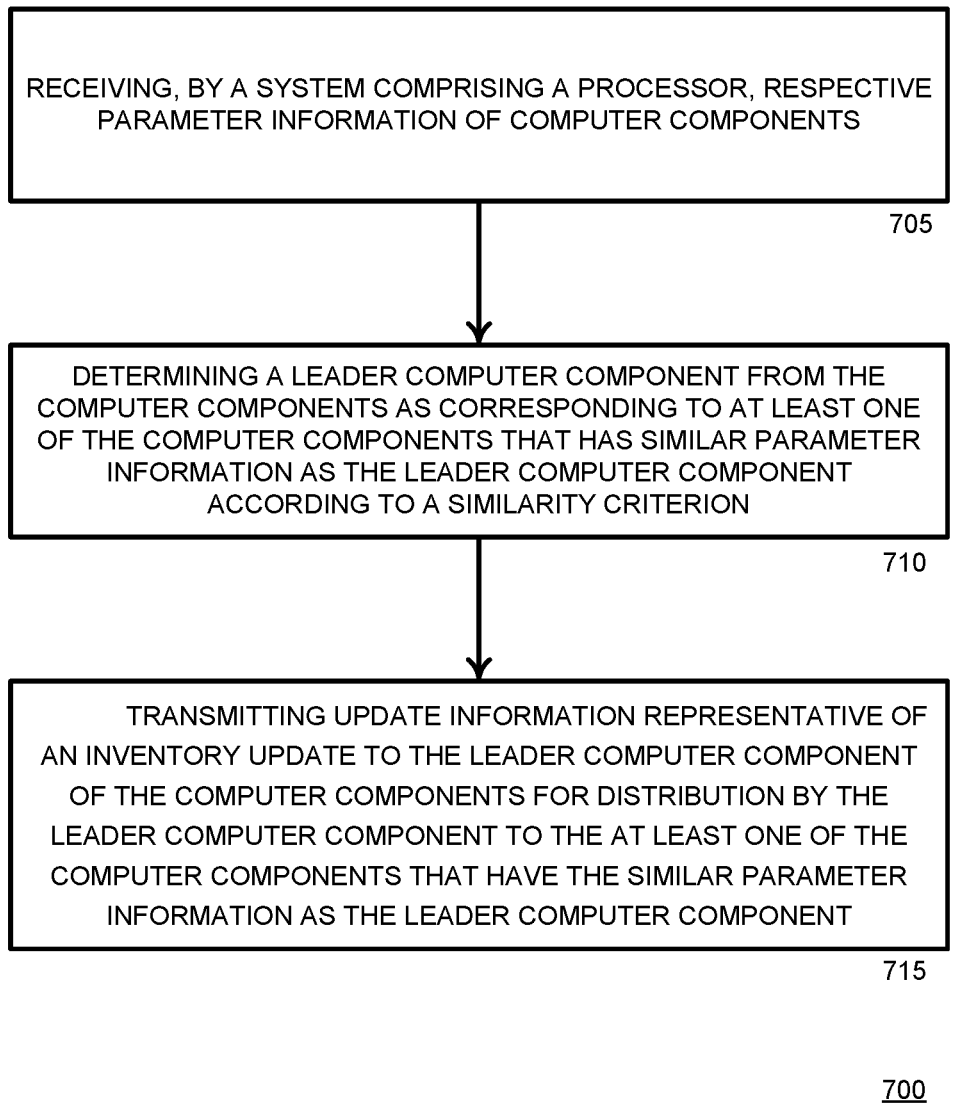
FIG. 7 illustrates a flow diagram of a method for delivering an update to each of a group of similar computer components, such as servers, via a leader computer component, or leader server, of the group.

Turning now to FIG. 7, the figure illustrates example method embodiment 700 that comprises receiving, by a system comprising a processor, respective parameter information of computer components at step 705. The processor may be part of a computer system of an enterprise's information technology system 'cloud' ("IT cloud") that is running a systems management application or a systems management console application. A systems management console application may provide a user interface for a user, authorized to log in to and to make changes within the IT cloud, to review firmware loads of the computer components, such as a plurality of various servers, that provide services to client computing devices of the enterprise, or to customers/potential customer of the enterprise. At step 710 the processor, or application running thereon, may determine a leader computer component from the computer components as corresponding to at least one of the computer components as having matching, or similar, parameter information as the leader computer component according to a similarity criterion. A similarity criteria may include characteristic, or parameter, information for characteristics or parameters such as manufacturer, manufacturer model number, manufacturer model name, manufacture date, attached one or more hardware peripherals (including manufacturer or name or model number of date of the one or more hardware peripheral). Accordingly, the leader computer component is a computer component of a group of other computer components that all share similar, or identical, characteristic, or parameter, information. At step 715 the processor, or application running on the computer system of the enterprise's information technology system transmits update information representative of an inventory update to the leader computer component of the computer components of the group for distribution by the leader computer component to the at least one of the computer components that have the similar parameter information as the leader computer component. The inventory update typically comprises a firmware update, but could comprise a software update instead of, or in addition to, a firmware update.

Turning now to FIG. 8 the figure illustrates example method embodiments 800. In example embodiment 805 transmitting of an update, or update information, comprises transmitting the update information to a leader computer component as an only (i.e., single) inventory update generated by a systems management console user interface, or by an application that provides systems management console user interface. As part of the transmitting of the update information the systems management console user interface (or application that provide it) may not transmit the update/update information to any of the at least one of the computer components that have the similar parameter information as the leader computer component.

In example embodiment 810, the leader computer component may be determined based on the leader computer component being a closest component to a top of rack network switch. The leader computer component may be determined based on the leader computer component being a lowest resource loading computer component, among the at least one of the computer components that have the similar parameter information, with a lowest resource loading. The leader computer component may be determined randomly. The leader computer component may be determined manually by a user using a systems management console user interface.

In example embodiment 815, parameters corresponding to the similar parameter information of the at least one of the computer components comprise: a chipset specification parameter or a hardware inventory parameter. A chipset specification parameter may comprise a processor model number of a processor corresponding to, or that is supported by, one or more other chips on a mainboard or mother board of a server. A hardware inventory parameter may include a particular hardware peripheral that is attached to, coupled with, or that is part of, a server.

Figure 9:
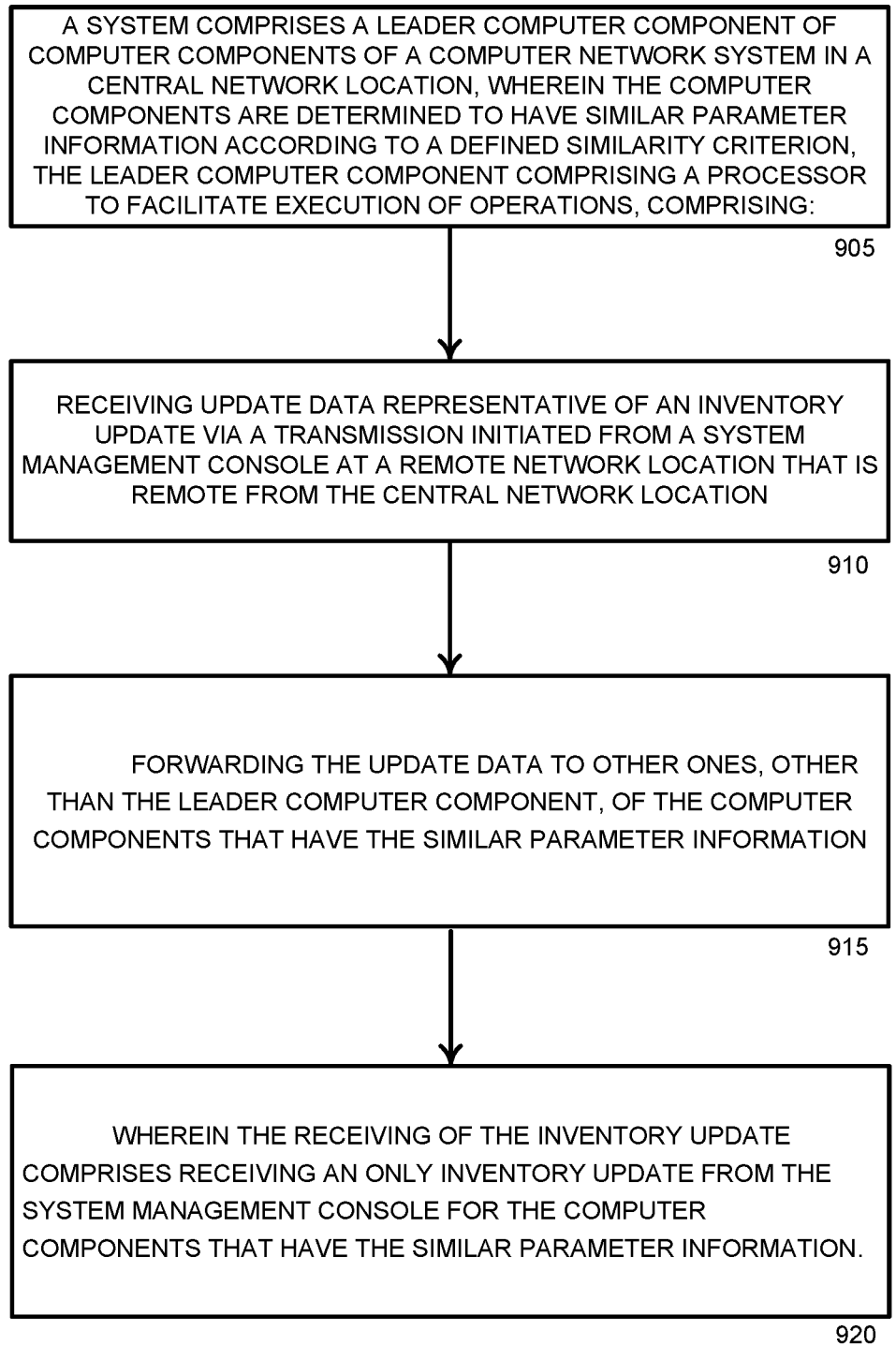
FIG. 9 illustrates a flow diagram of steps that a system having a leader computer component server performs in providing an update to multiple computer components having similar characteristics as the leader.

Turning now to FIG. 9, the figure illustrates an example system embodiment 900 that comprises at block 905 a leader computer component of a group of computer components of a computer network system in a central network location, wherein the computer components are determined to be members of the group because they have similar parameter information according to a defined similarity criterion. The leader computer component comprises a processor to facilitate execution of operations that comprise: receiving at block 910 update information or data representative of an inventory update via a transmission initiated from a system management console at a remote network location that is remote from the central network location, and forwarding at block 915 the update data to other ones, other than the leader computer component, of the computer components that have the similar parameter information. At block 920 the receiving of the inventory update may comprise receiving an only (i.e., a single) inventory update from the system management console for the computer components that have the similar parameter information. In other words, the leader receives only one update package, file, or firmware (or software) load but distributes copies of the only/single/one update package to each of the members of the group of computer components.

Turning now to FIG. 10, the figure illustrates a flow diagram of an example method 1000 that comprises at step 1005 receiving, by a leader computer component comprising a processor and that is part of a group of computer components of a computer network system in a central network location, an inventory update via a transmission from a system management console that is remote from the central network location, wherein the group of computer components have been determined to have similar parameter information according to a similarity criterion; and forwarding, by the leader computer component the inventory update to other ones of the group of computer components that have the similar parameter information. In block 1010 the inventory update, which may be a computer file or other form of computer of code, information, or data, that is received from the system management console is the only inventory update that is received from the system management console for updating of the group of components that have the similar parameter information.

Figure 11:
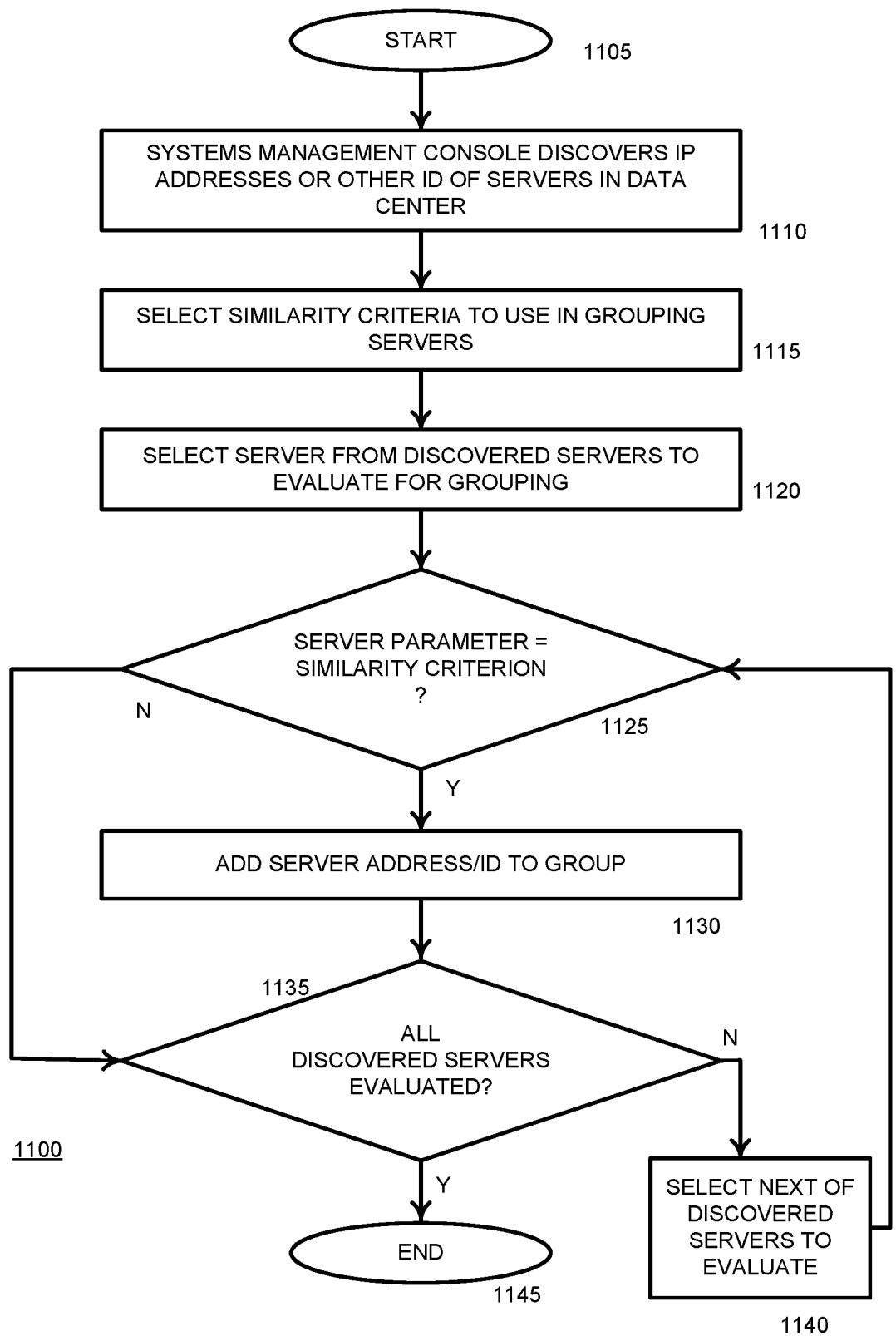
FIG. 11 illustrates a flow diagram of a method for determining a grouping of computer component, such as servers, having similar characteristics, or similar parameter values, as one another.

Turning now to FIG. 11, the figure illustrates an example embodiment of a method 1100 to group computer components, such as network servers at a data center, together to facilitate delivering over a communication network a single firmware update from a remote computer device (remote from the servers geographically or logically), such as a systems management console user interface, or an application that provides the systems management console user interface. Method 1100 starts at step 1105. At step 1110 a systems management console, or an application that provides the systems management console, discovers IP addresses or other identification of servers in the data center. The systems management console may discover the addresses or other identification via a discovery protocol such as LLDP. At step 1115 a similarity criteria is selected, or chosen (manually or automatically), to use as a basis for grouping servers at the data center with other servers that have similar characteristics. For example, it may be desirable to group servers together that were manufactured by the same manufacturer, that have the same model number, or that have other similar characteristics such that the servers should have the same firmware.

At step 1120 the systems management console selects a first server from the servers that were discovered at step 1110. At step 1125 determination is made whether the server selected at step 1120 has parameter information corresponding to the similarity criteria selected, or chosen, at step 1115. If a determination is made at step 1125 that the server being evaluated has the parameter characteristic, or parameter information, as the similarity criteria selected at step 1115 (e.g., the similarity criteria is a manufacturer and the server being evaluated has information associated with it that indicates that it was made by the same manufacturer as specified by the similarity criteria at step 1115), then the server being evaluated at step 1125 is added to a group list according to the servers IP address, or other identifying information discovered at step 1110. It will be appreciated that during discovery at step 1110 the parameter information, such as manufacturer or model number, may be returned from the server being discovered. Or, the discovery at step 1110 may result in discovering an IP address of the server and the server's network name, which the systems management console may use determine the manufacturer or model number, or parameter information, from a database, table, list, etc., that associates server IP address or server name with the parameter information.

At step 1135, a determination is made whether all servers discovered at step 1110 have been evaluated at step 1125. If the result of the determination at step 1135 is that all of the servers discovered at step 1110 have not been evaluated at step 1125, at step 1140 a next server from the list of servers discovered at step 1110 is selected for evaluation at step 1125 and method 1100 returns to step 1125.

Returning to discussion of step 1125, if the determination is made that a server being evaluated does not have parameter information that meets the similarity criteria selected at step 1115, then step 1130 is bypassed and method 1100 advances to step 1135, Regardless of whether processing at step 1135 was reached from step 1125 or step 1130, if a determination is made at step 1135 that all servers discovered at step 1110 have been evaluated at step 1125, method 1100 advances to step 1145 and ends with a group of servers provided in a list, a table, a database, or other form, wherein the server in the group share similar characteristic parameter values such that the servers of the group should have the same firmware loaded thereon.

Figure 12:
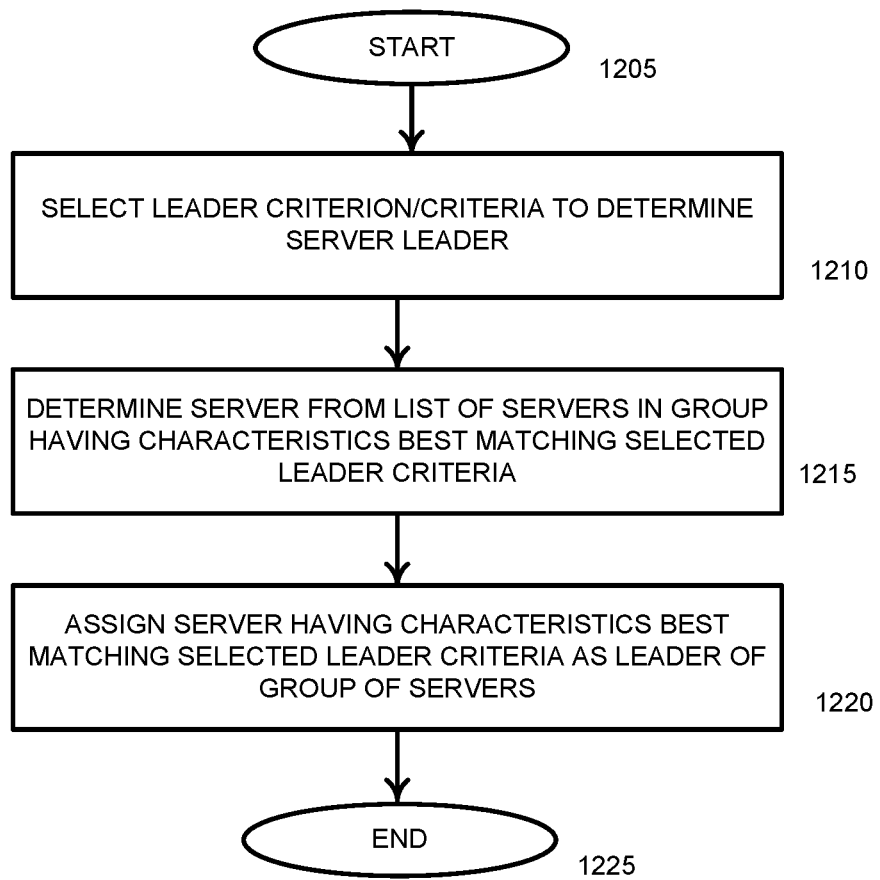
FIG. 12 illustrates a flow diagram of a method for choosing a leader computer components, such as a server, from a group of computer components, or server, from a listing thereof.

Turning now to FIG. 12, the figure illustrates a flow diagram of a method 1200 for selecting a leader of a group of servers that have been determined should have the same firmware loaded thereon. Method 1200 begins at step 1205, typically after the servers have been grouped together according to a method or process similar the method described above in reference to FIG. 11. At step 1210 of method 1200 a criteria to select a leader server of the group of servers is determined. Selection of the server leader criteria may be performed by a user using a systems management console application user interface. In an embodiment an application running the systems management console user interface may automatically determine the server leader criteria. The criteria selected may be one or more of: a server being the closest to a top of rack switch, a server from among the group having the lowest current resource loading of the servers of the group, or other criteria that may be described elsewhere herein or that otherwise makes the leader an efficient computer server to receive a firmware update and then distribute copies to the update to the other servers of the group.

At step 1215 a leader server is determined from the group/list of servers according to the criteria determine at step 1210. At step 1220 the server determined to be the leader server at step 1215 is assigned leader server status. Such leader server status may include identifying, withing a systems management console application, the IP address of the selected leader, such that firmware updates for the group are sent to the leader server's IP address until the leader server's status as leader is changed, or until a new grouping is determined (such as may be determined again as described in reference to FIG. 11, for example). The leader server may also be 'informed' of its status as leader node in a message sent from a systems management console application.

In an example embodiment, a cluster of servers, which typically refers to servers having identical hardware composition and which are 'known' or have been associated with each other at a systems management console application as having identical, or substantially identical hardware configurations (e.g., a server may have a different hardware circuit board or chip set revision number but still be operationally identical to another), may identify the leader server of the cluster which may use a discovery protocol to obtain the firmware versions of the other servers of the cluster, include the various firmware versions in a listing, or catalogue, and forward the catalogue to a systems management console application for determination of a custom firmware package, or load, that should be sent to the cluster leader for further distribution to the other servers of the cluster. Method 1200 ends at step 1225.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a system comprising a processor, respective parameter information of computer components;
determining a leader computer component from the computer components as corresponding to at least one of the computer components that has similar parameter information as the leader computer component according to a similarity criterion; and transmitting update information representative of an inventory update to the leader computer component of the computer components for distribution by the leader computer component to the at least one of the computer components that have the similar parameter information as the leader computer component, wherein the determining of the leader computer component comprises determining the leader computer component based on the leader computer component being a closest component to a top of rack network switch or based on the leader computer component being a lowest resource loading computer component, among the at least one of the computer components that have the similar parameter information, with a lowest resource loading.

2. The method of claim 1, wherein at least one of the computer components are servers, wherein the leader computer component is a server of the servers, and wherein the inventory update comprises revisions for firmware of each of the at least one of the computer components that have the similar parameter information as the leader computer component.

3. The method of claim 1, wherein the computer components are coupled to the top of rack network switch.

4. The method of claim 1, wherein the transmitting of the update information comprises transmitting the update information to the leader computer component as a single inventory update generated by a systems management console, and wherein, as part of the transmitting of the update information, the systems management console does not transmit the update information to any of the at least one of the computer components that have the similar parameter information as the leader computer component.

5. The method of claim 1, wherein parameters corresponding to the similar parameter information of the at least one of the computer components comprise: a chipset specification parameter or a hardware inventory parameter.

6. A system, comprising:
a leader computer component of computer components of a computer network system in a central network location, wherein the computer components are determined to have similar parameter information according to a defined similarity criterion, the leader computer component comprising a processor to facilitate execution of operations, comprising:
receiving update data representative of an inventory update via a transmission initiated from a system management console at a remote network location that is remote from the central network location;
forwarding the update data to other ones, other than the leader computer component, of the computer components that have the similar parameter information; and
determining the leader computer component to be the leader computer component based on the leader computer component being a closest component to a top of rack switch or based on the leader computer component being a lowest resource loading computer component, among the at least one of the computer components that have the similar parameter information, with a lowest resource loading,
wherein the receiving of the inventory update comprises receiving an only inventory update from the system management console for the computer components that have the similar parameter information.

7. The system of claim 6, wherein the computer components of the computer network system are coupled to top of rack switch, and wherein the top of rack switch is configured to collect the parameter information of each of the computer components coupled thereto according to a protocol for collecting and organizing information about managed devices on Internet protocol networks.

8. The system of claim 6, wherein the system management console is configured to collect the parameter information of each of the computer components coupled to a top of rack switch according to a protocol for collecting and organizing information about managed devices on Internet protocol networks for purposes of determining the leader computer component of the computer components before the inventory update is transmitted to the leader node and wherein the system management console discovers the leader node to transmit the inventory update to according to the protocol for collecting and organizing information about managed devices on Internet protocol networks without discovering the other of the computer components for purposes of transmitting the inventory update.

9. The system of claim 8, wherein the protocol for collecting and organizing information about managed devices on Internet protocol networks is simple network management protocol.

10. The system of claim 9, wherein the simple network management protocol is a link layer discovery protocol.

11. The system of claim 6, wherein the central network location is a data center and the system management console is a user interface configured to access the central network location via an internetworking protocol.

12. The system of claim 6, wherein the processor of the leader component is further to:
collect parameter information of each of the computer components according to a protocol for collecting and organizing information about managed devices on Internet protocol networks;
determine a catalogue of firmware versions of each of the respective computer components of the computer components;
determine a preferred firmware version based on the catalogue of firmware version; and
transmit, according to the protocol for collecting and organizing information about managed devices on Internet protocol networks, preferred firmware, corresponding to the preferred firmware version, to the other of the computer components that are not running according to the preferred firmware version.

13. A method, comprising:
receiving, by a leader computer component comprising a processor and that is part of a group of computer components of a computer network system in a central network location, an inventory update via a transmission from a system management console that is remote from the central network location, wherein the group of computer components have been determined to have similar parameter information according to a similarity criterion; and forwarding, by the leader computer component the inventory update to other ones of the group of computer components that have the similar parameter information; and
determining the leader computer component to be the leader computer component based on the leader computer component being determined to be a closest component to a top of rack switch or based on the leader computer component being determined to be a lowest resource loading computer component, among the at least one of the computer components that have the similar parameter information, with a lowest resource loading, or randomly, wherein the inventory update that is received from the system management console is the only inventory update that is received from the system management console for the group of components that have the similar parameter information.

14. The method of claim 13, wherein the group of computer components of the computer network system are coupled to the top of rack switch, and wherein the top of rack switch is configured to collect the similar parameter information of the group of computer components coupled thereto according to a discovery protocol.

15. The method of claim 13, further comprising determining the leader computer component using a protocol that directs and manages collection and organizing information about managed devices on Internet protocol networks, wherein the determining of the leader computer component occurred before the receiving of the inventory update by the leader computer component, and wherein the system management console discovered the leader computer component according to the protocol that directs and manages collection and organizing information about managed devices on Internet protocol networks without discovering other ones of the group of computer components that will receive the inventory update in addition to the leader computer component.

16. The method of claim 13, further comprising:

collecting, by the leader computer component, parameter information of each of the group of computer components according to a protocol for collection and organization of information about managed devices on Internet protocol networks;

determining, by the leader computer component, a catalogue of firmware versions of each of the group of computer components;

determining, by the leader computer component, a preferred firmware version based on the catalogue of firmware versions; and transmitting, by the leader computer component, according to the protocol for preferred firmware data, corresponding to the preferred firmware version, to any of the other ones of the group of computer components that are not executing firmware according to the preferred firmware version.

17. The method of 16, further comprising, in response to determining the leader computer component is not currently executing firmware according to the preferred firmware, forwarding, by the leader computer component, an instruction from the leader computer component to one of the group computer components executing firmware according to the preferred firmware version to forward the firmware therefrom to the leader computer component.

18. The method of claim 16, wherein the protocol is a link layer discovery protocol.

19. The method of claim 13, wherein the group of computer components is a group of computer servers in a data center rack, and wherein the inventory update is a preferred version of server firmware to be used in the group of computer servers.

20. The method of claim 13, wherein the leader computer component and the other computer components of the group of computer components are servers.

* * * * *